United States Patent
Bourbigot

(10) Patent No.: US 12,060,912 B2
(45) Date of Patent: Aug. 13, 2024

(54) PROTECTIVE BELLOWS AND TRANSMISSION JOINT PROVIDED WITH SUCH A BELLOWS

(71) Applicant: TRELLEBORG CARQUEFOU, Carquefou (FR)

(72) Inventor: Lionel Bourbigot, Vertou (FR)

(73) Assignee: TRELLEBORG CARQUEFOU, Carquefou (FR)

( * ) Notice: Subject to any disclaimer, the term of this patent is extended or adjusted under 35 U.S.C. 154(b) by 499 days.

(21) Appl. No.: 17/294,610

(22) PCT Filed: Dec. 2, 2019

(86) PCT No.: PCT/FR2019/052888
§ 371 (c)(1),
(2) Date: May 17, 2021

(87) PCT Pub. No.: WO2020/115414
PCT Pub. Date: Jun. 11, 2020

(65) Prior Publication Data
US 2022/0010845 A1    Jan. 13, 2022

(30) Foreign Application Priority Data

Dec. 3, 2018   (FR) ...................................... 18 72230

(51) Int. Cl.
*F16D 3/84*      (2006.01)
*F16J 3/04*      (2006.01)

(52) U.S. Cl.
CPC .............. *F16D 3/845* (2013.01); *F16J 3/042* (2013.01); *Y10S 464/906* (2013.01)

(58) Field of Classification Search
CPC ........ F16D 3/845; F16J 3/042; Y10S 464/906
(Continued)

(56) References Cited

U.S. PATENT DOCUMENTS 3,520,152 A * 7/1970 Leopold ................ F16D 3/2245
                                                              464/175
5,027,665 A * 7/1991 Hayward ............ F16C 11/0671
                                                              464/175
(Continued)

FOREIGN PATENT DOCUMENTS

DE            94 05 633         6/1994
DE      10 2017 104442         9/2018
(Continued)

OTHER PUBLICATIONS

Japanese Office Action (and translation) dated Oct. 18, 2023.

*Primary Examiner* — Greg Binda
(74) *Attorney, Agent, or Firm* — IPSILON USA, LLP

(57) ABSTRACT

Disclosed is a protective bellows (1) in the form of a tubular body (2) open at each of its ends, the body (2) having two zones (3, 4) of differentiated cross-section, one (3) of the zones (3, 4) of smaller cross-section called the small base (3) of the body (2) and the other zone (4) of larger cross-section called the large base (4) of the body, the zones (3, 4) being separated from each other by a wall referred to as the deformable outer radial wall of the body (2), this wall (6) extending transversely to the longitudinal axis of the body (2). The outer radial wall (6) of the body (2) is provided, at its zone (12) connecting to the large base (4) of the body (2), with an outer peripheral groove (7) with an outer radial opening (8), this groove (7) having one of its sides (9, 10) and the bottom (11) of the groove (7) projecting from the face (61) of the deformable outer radial wall (6) turned towards the small base (3) of the body (2).

9 Claims, 3 Drawing Sheets

(58) Field of Classification Search
USPC .......................... 464/173, 175; 277/635–636
See application file for complete search history.

(56) References Cited

U.S. PATENT DOCUMENTS

2006/0273528 A1* 12/2006 Schirmer ................. F16J 3/043
                                                                                           277/635
2007/0287546 A1    12/2007  Fischer
2019/0162243 A1     5/2019  Kim et al.

FOREIGN PATENT DOCUMENTS

| | | |
|---|---|---|
| JP | H0378134 | 8/1991 |
| JP | S578947 | 1/1998 |
| KR | 2015 0125575 | 11/2015 |
| KR | 10-1865190 | 11/2017 |

* cited by examiner

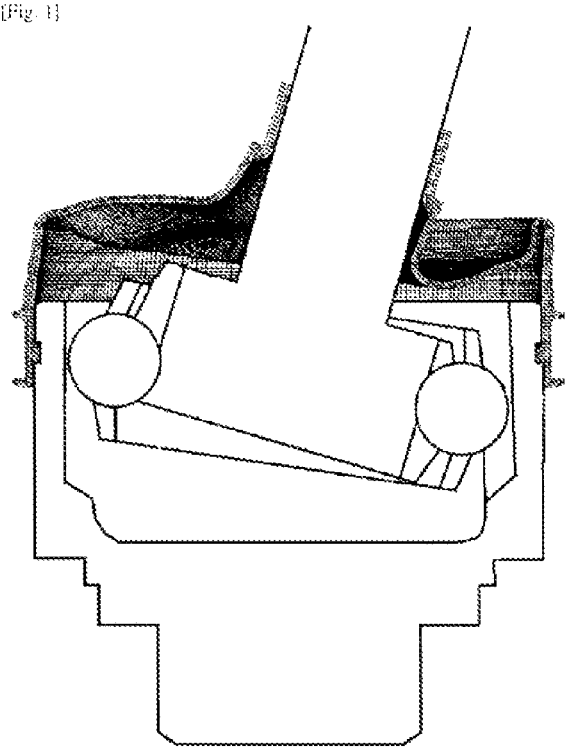
[Fig. 1]
(PRIOR ART)

[Fig. 2]
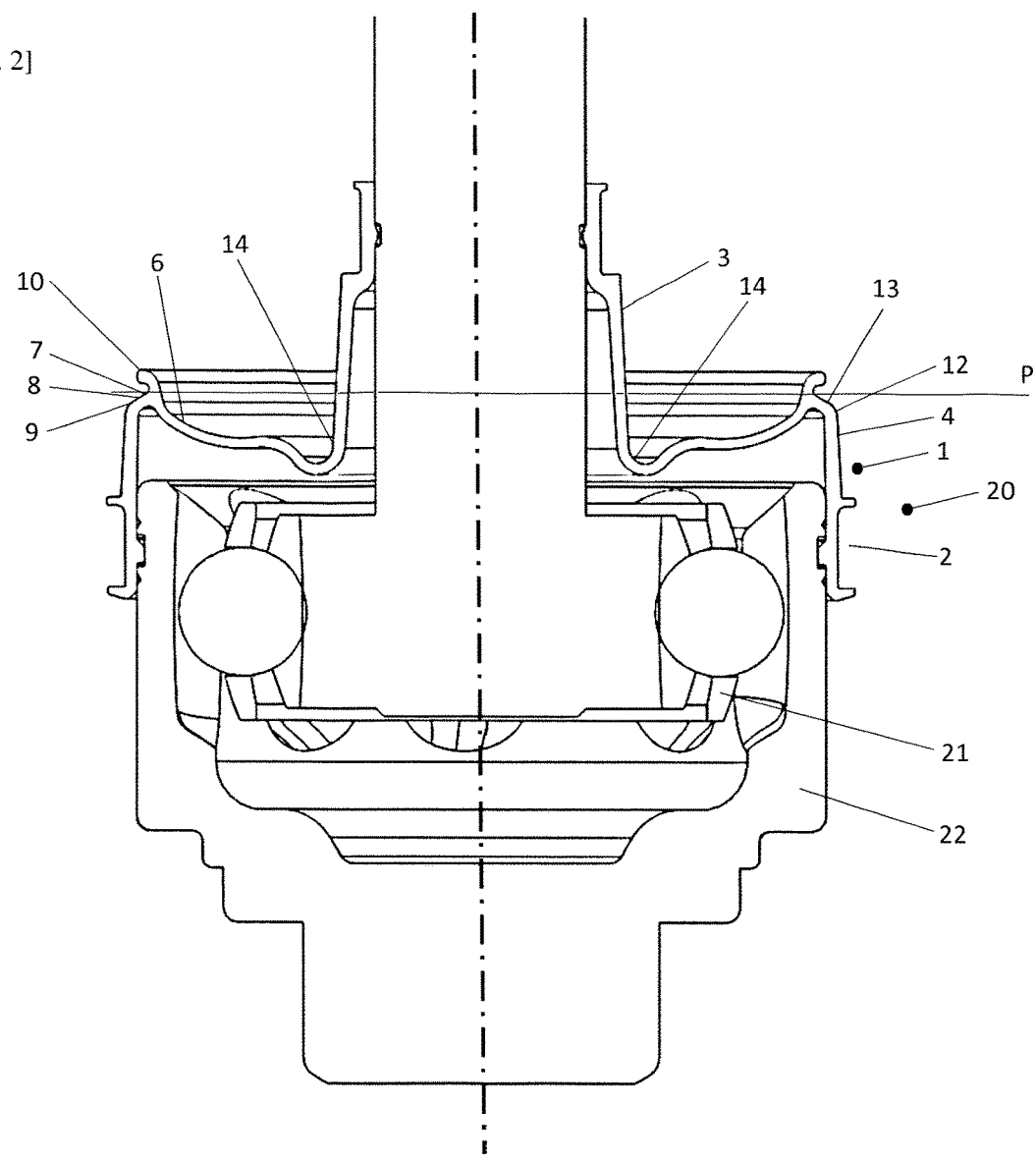
[Fig. 3]
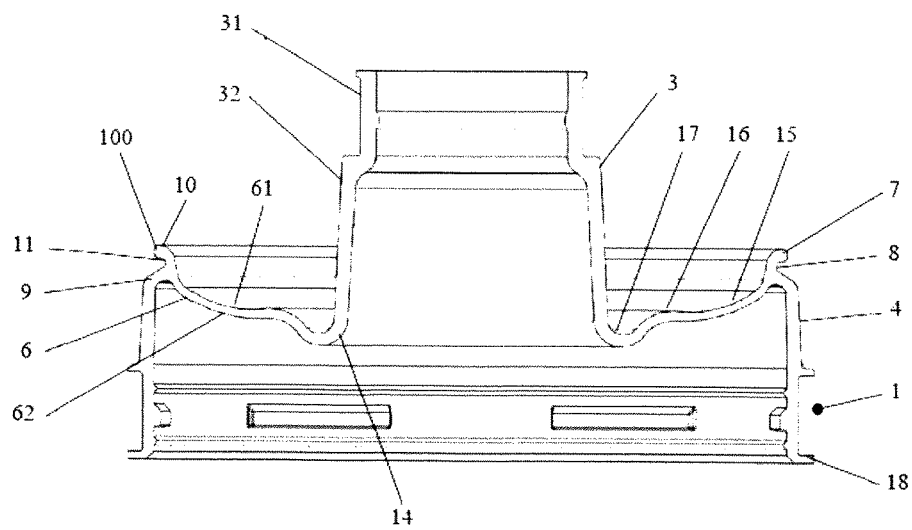

[Fig. 4]
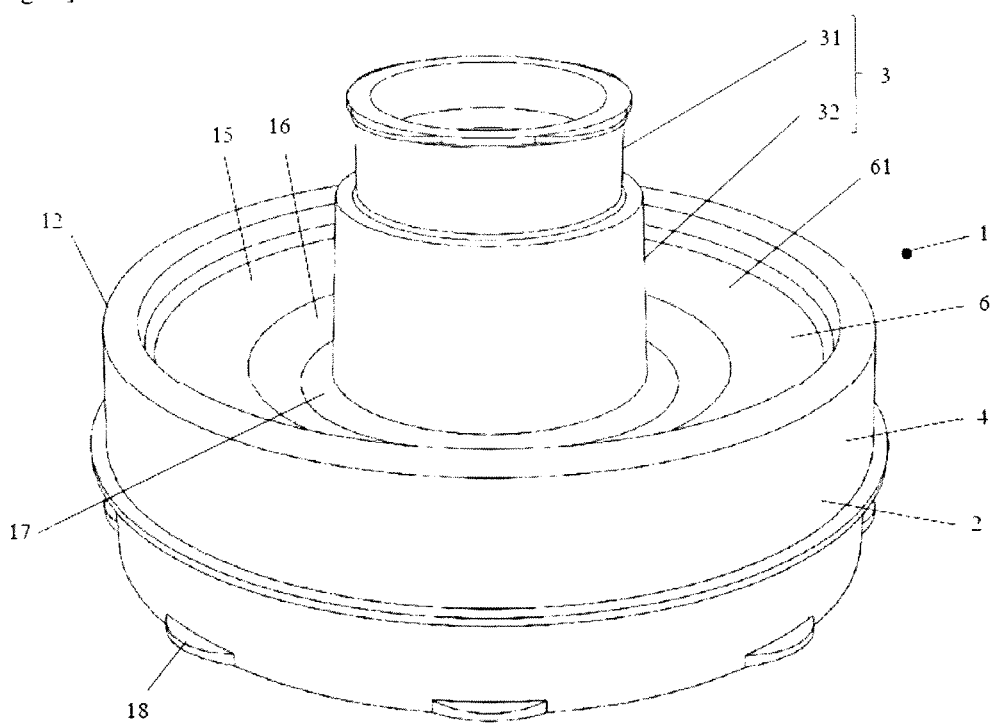

PROTECTIVE BELLOWS AND TRANSMISSION JOINT PROVIDED WITH SUCH A BELLOWS

RELATED APPLICATION

This application is a National Phase of PCT/FR2019/052888 filed on Dec. 2, 2019, which claims the benefit of priority from French Patent Application No. 18 72230, filed on Dec. 3, 2018, the entirety of which are incorporated by reference.

FIELD OF THE INVENTION

The invention relates to a protective boot, which is in particular suitable for at least partial protection of the male element and female element of a transmission joint, and to a transmission joint equipped with such a boot.

It relates more particularly to a protective boot in the form of a tubular body that is open at each of its ends, said body having two zones of different sections, with one of the zones, of smaller section, called the small fastening base of the body and the other zone, of larger section, called the large fastening base of the body, said zones being separated from one another by a wall called the deformable external radial wall of said body, this wall called the deformable external radial wall extending transverse to the longitudinal axis of said body.

DESCRIPTION OF RELATED ART

Such a protective boot is known as illustrated in FIG. 1, which shows the prior art. Specifically, the use of a joint, called a constant-velocity joint, as a power transmission element for transmitting rotational drive power between a vehicle drive shaft and the wheels of said vehicle is conventional.

In motor vehicles, for example, between the gearbox and each wheel of the vehicle, a transmission is provided that is made up of two shafts connected to one another by a mechanical transmission member that requires lubrication. Generally, the shaft coming from the gearbox is equipped with a tulip that constitutes the female element of the transmission member connecting this first shaft to the second transmission shaft. This female element has a cavity. The cavity thus delimits a recess intended to receive rollers. Each roller is carried by a male element that has roller trunnions. This male element is itself coupled to the second transmission shaft. A protective boot of such a constant-velocity joint of the type described above may comprise a boot that, at one end, has a large base that, in the mounted state, is pressed against the exterior surface of the tulip or cup of the joint. This large base therefore has an interior surface that has a shape complementary to the exterior shape of the tulip. In the state in which the boot is mounted on said tulip, a ring or collar surrounds the large base of the boot, in the form of a circular surface concentric with the longitudinal axis of the boot, in order to press the surface of this large base against the periphery of the tulip. The small base of the boot is for its part fastened to the transmission shaft joined to the male element of the joint.

The drawback of such a boot lies in its behavior upon deformation, in particular when the shafts of the male element and female element of the joint form an angle between one another. In this case, the deformable external radial surface of the body has a tendency to "blister", i.e. to deform by bulging in the manner of a blister. This results in a risk of premature wear of the boot.

Boots in several parts, of which the connecting wall between the large base and the small base of the body of the boot is a pleated wall provided with an axial groove as illustrated by patent US 2007/0287546, are moreover known. This is also the case with patent application DE 10 2017 104 442 or utility model DE 9405633.

OBJECTS AND SUMMARY

An aim of the invention is to propose a boot, the design of which makes it possible to limit or even eliminate the blistering phenomena observed in the prior art.

To this end, one subject of the invention is a protective boot, in particular for at least partial protection of the male element and female element of a transmission joint, said boot being in the form of a tubular body that is open at each of its ends, said body having two zones of different sections, with one of the zones, of smaller section, called the small base of the body and the other zone, of larger section, called the large base of the body, said zones being separated from one another by a deformable external radial wall of said body, this deformable external radial wall extending transverse to the longitudinal axis of said body, characterized in that the deformable external radial wall, the small base and the large base of the body are made in one piece, in that the deformable external radial wall of said body, which has a face turned toward the small base of the body, is provided at its zone for connection to the large base of the body with an external peripheral groove with an external radial opening, in that this groove comprises at least two flanks and a bottom, in that the flanks of the groove extend one on one side and the other on the other side of a plane that is perpendicular to the longitudinal axis of the body and passes through the bottom of the groove and in that one of the flanks and the bottom of the groove protrude from the face of the deformable external radial wall that is turned toward the small base of the body so as to form a reinforcing rib.

The presence of an external circumferential groove with an external radial opening, i.e. opening radially outwards, for allowing the formation of a circular reinforcing rib on the side of the face of the deformable external radial wall that is turned toward the small base of the body makes it possible to limit the risk of this deformable external radial wall "blistering". The flanks of the groove are radial flanks. Thus, the space left free between the flanks, which forms the opening of the groove, allows a radial opening to be made.

According to one embodiment, the deformable external radial wall is a pleated wall comprising one or more pleats, the one or more pleats extending on the same side of the plane that is perpendicular to the longitudinal axis of the body and passes through the bottom of the groove, this side of the plane corresponding to the side of the plane that is turned toward the large base of the body.

According to one embodiment, the deformable external radial wall comprises, from its zone for connection to the large base of the body that forms the external peripheral edge of said wall in the direction of its opposite peripheral edge, a succession of at least three pleats. The presence of these axial pleats makes it possible to increase the extension of the boot when the shafts of the male element and female element of the transmission joint form an angle.

According to one embodiment, the succession of at least three pleats comprises a concave pleat with concavity turned toward the small base, a convex pleat with convexity turned toward the small base and a concave pleat with concavity turned toward the small base.

According to one embodiment, the small base has an active fastening part separated from the deformable external radial wall by a tubular part of the body that is called the transition zone, this transition zone between the deformable external radial wall and the active fastening part of the small base having, at the level of the tubular part of the body that delimits same, a thickness of said body that is greater than the thickness of the deformable external radial wall.

According to one embodiment, this transition zone between the external radial wall and the active fastening part of the small base has a thickness of the body that increases from the external radial wall in the direction of the free end of said small base.

According to one embodiment, the body has a thickness that increases from the external peripheral edge of the deformable external radial wall that is formed by the zone for connecting said wall to the large base of the body in the direction of the free end of the small base of the body.

According to one embodiment, the flank of the groove that protrudes from the face of the deformable external radial wall that is turned toward the small base of the body has a free edge that is set back from a part of the body that serves to delimit the large base of the body. This arrangement makes it easier to stack the boots during the storage phase before said boots are mounted.

According to one embodiment, the groove has a C or U shape when viewed in section.

A further subject of the invention is a transmission joint for a vehicle transmission, comprising a male element and a female element and a boot for at least partial protection of said male element and female element, characterized in that said protective boot is in accordance with that described above.

BRIEF DESCRIPTION OF THE DRAWINGS

The invention will be clearly understood upon reading the following description of exemplary embodiments, with reference to the appended drawings in which:

FIG. 1 shows a sectional view of a transmission joint of the prior art;

FIG. 2 shows a sectional view of a transmission joint in accordance with the invention;

FIG. 3 shows a sectional view of a boot in accordance with the invention; and

FIG. 4 shows a perspective view of a boot in accordance with the invention.

DETAILED DESCRIPTION

As mentioned above, the invention relates to a protective boot 1 that is suitable in particular for the protection of the male element 21 and female element 22 of a constant-velocity transmission joint 20, and also to such a joint. This joint 20 allows for example the transmission of a rotary movement between the shaft coming from the gearbox and the wheel shaft in a vehicle transmission. As mentioned above, the male element 21 can be formed by a transmission shaft with radial roller-carrying arms in a manner known per se. The joint 20 also comprises a female element 22 with which the shaft coming from the gearbox is equipped. This female element 22, also called a tulip, takes the form of a housing capable of at least partially housing the rollers of the male element 21, which rollers can be inserted into the housing via the open end of the housing. In the example shown, this housing has a bottom and a lateral wall inscribed in a cylinder. This housing is provided at its bottom with an exterior extension called the stem. This stem forms an extension of the shaft to which the joint is to be connected. The protective boot 1 allows at least partial protection of the male element 21 and female element 22 of such a joint. This boot 1 is in the form of a tubular body 2 that is open at each of its ends and therefore has a longitudinal axis. This tubular body 2 is preferably made from a synthetic material, in particular from a thermoplastic elastomer of the copolyester ether type or the like. Generally, such a boot is a molded component. This boot 1 is preferably produced by injection molding.

The body 2 of the boot 1 has, as illustrated in FIG. 3, two zones of different cross sections and shown by 3 and 4 in the figures, with one 4 of the zones being of section larger than the section of the other zone. These zones 3, 4 of different sections are offset axially along said body 2. The zone of smaller section, shown by 3 in the figures, is called the small base of the body 2. This zone 3 of smaller section allows the protective boot 1 to be fastened to the male element 21 of the joint 20 once the male element 21 has been introduced into the boot 1 via, for example, the zone 4 of larger section of the body 2. To this end, a clamping ring can surround this zone 3 of smaller section in the vicinity of the free end of the tubular body 2 so as to press a part of the body 2 that constitutes said zone 3 of smaller section against the male element 21 of the joint 20. This part of the zone of smaller section, against which a clamping ring is able to be pressed, is called the active fastening part 31 of the small base 3. The zone 4 of larger section, called the large base 4 of the body 2, allows the protective boot 1 to be fastened to the female element 22 of the joint 20. To this end, the large base 4 of the body 2 is provided on the outside with circular external radial protrusions 18 delimiting a recess inside which a clamping ring can be accommodated.

These zones 3 and 4 of different sections are separated from one another by a deformable wall 6 of said body. This wall 6 extends transverse to the longitudinal axis of the body and is called the external radial wall 6 of said body. The tubular body 2 thus forms a stepped body, the stepped part of which is formed by said deformable external radial wall 6.

This external radial wall 6 is a wall for connecting the small base 3 and the large base 4 of the body 2 to one another. The deformable external radial wall 6, the small base 3 and the large base 4 of the body 2 are made in one piece.

This external radial wall 6 comprises an external peripheral edge 13 formed by the zone 12 for connecting said wall 6 to the large base 4 of the body and an opposite peripheral edge 14, called the internal edge, formed by the zone 12 for connecting said wall 6 to the small base 3 of the body 2. This external radial wall 6 comprises a face 61 turned toward the small base 3 and an opposite face 62 turned toward the large base 4 of the body 2.

In order to limit the risk of blistering, the boot 1 is provided with an external peripheral groove 7 with an external radial opening 8, i.e. opening radially outwards, for allowing the formation of a circular reinforcing rib on the side of the face of the deformable external radial wall 6 that is turned toward the small base of the body 2. This circular external peripheral groove 7 is disposed at the level of the zone 12 for connecting the deformable external radial wall 6 to the large base 4 of the body 2. This groove 7 has a C or U shape when viewed in section. This groove 7 comprises at least two flanks 9 and 10 and a bottom 11. One of the flanks, namely the flank 10 of the groove 7, protrudes from the face 61 of the deformable external radial wall 6 that is turned toward the small base 3 of the body 2. This flank 10 that protrudes from the face 61 of the deformable external radial wall 6 that is turned toward the small base 3 of the body 2 and the bottom 11 of the groove 7 form the reinforcing rib limiting the deformation of the boot 1 at this location. The flank 10 of the groove 7 that protrudes from the face 61 of the deformable external radial wall 6 that is turned toward the small base 3 of the body 2 has a free edge 100 that is set back from the part of the body 2 that serves to delimit the large base 4 of the body 2. Thus, such a boot can be stored in the state in which it is stacked with a similar boot 1 before use.

The flanks 9 and 10 of the groove 7 extend one on one side and the other on the other side of a plane P that is perpendicular to the longitudinal axis of the body 2 and passes through the bottom 11 of the groove 7. This plane intersects the bottom 11 of the groove 7. In other words, the flanks 9 and 10 of the groove 7 extend on either side of the plane P. Thus, the opening 8 of the groove 7 is an external radial opening, the opening of the C or of the sideways U formed by the groove is turned toward the outside of the boot.

In the examples shown, the deformable external radial wall 6 is a pleated wall. This pleated wall may comprise one or more pleats. Preferably, the one or more pleats extend on the same side of the plane P that is perpendicular to the longitudinal axis of the body 2 and passes through the bottom 11 of the groove 7. This side of the plane corresponds to the side of the plane that is turned toward the large base 4 of the body 2. Thus, the flank 10 that protrudes from the face of the external radial wall 6 that is turned toward the small base 3 of the body 2 extends on one side of the plane P while the other flank 9 of the groove, produced in one piece with the wall 6, and the pleats of said deformable external radial wall 6 extend on the other side of said plane P.

This pleated wall 6 comprises, from the external peripheral edge 13 of said wall in the direction of the opposite peripheral edge 14 of said wall 6, a succession of at least three pleats shown by 15, 16 and 17 in the figures, these pleats being called axial pleats. This succession of at least three pleats 15, 16, 17 comprises a concave pleat 15 with concavity turned toward the small base 3, a convex pleat 16 with convexity turned toward the small base 3 and a concave pleat 17 with concavity turned toward the small base 3. This succession of pleats makes it possible for the boot to have a significant extension when the shafts of the male element and female element of the transmission joint 20 form an angle.

In order to attempt to achieve the aim of an extension without blistering of the boot, the protective boot 1 has a variable thickness of the wall delimiting the tubular body 2. Thus, in the examples shown, the small base 3 has a part 31, called the active fastening part, separated from the pleated external radial wall 6 by a tubular part of the body 2 that is called the transition zone 32. This transition zone 32 between the pleated external radial wall 6 and the active fastening part 31 of the small base 3 has, at the level of the tubular part of the body 2 that delimits same, a thickness of said body 2 that is greater than the thickness of the pleated external radial wall 6. In particular, this transition zone 32 between the external radial wall 6 and the active fastening part 31 of the small base 3 has a thickness of the body 2 that increases from the external radial wall 6 in the direction of the free end of said small base 3. Likewise, the pleated deformable external radial wall 6 has a thickness that increases from its external peripheral edge 13 in the direction of its opposite peripheral edge 14. Thus, the body 2 has a thickness that increases from the external peripheral edge 13 of the pleated deformable external radial wall 6 that is formed by the zone 12 for connecting said wall 6 to the large base 4 of the body 2 in the direction of the free end of the small base 3 of the body 2. It will also be noted that, in the examples shown, the deformable external radial wall 6 exhibits a downward slope from the external peripheral edge in the direction of the internal peripheral edge of said wall when the boot is in the positioned state, with the longitudinal axis of the body extending vertically and the small base being disposed above the large base of the body.

A joint as described above is assembled in a manner similar to a joint of the prior art. During assembly of the joint, the male element 21 is therefore inserted into the boot by introducing the shaft with roller-carrying arms on the side of the large base of the boot until it protrudes from the small base of the boot. The female element 22 is then attached by partial insertion on the side of the large base of the boot 1 and partially covered, at the open end of the housing of the female element 22, by the large base of the boot. The clamping rings can then be positioned on the boot so as to fasten said boot 1 both to the male element 21 and to the female element 22.

The invention claimed is:

1. A protective boot, in particular for at least partial protection of the male element and female element of a transmission joint, said boot being in the form of a tubular body that is open at each of its ends, said body having two zones of different sections, with one of the zones, of smaller section, called the small base of the body and the other zone, of larger section, called the large base of the body, said protective boot comprising:

a deformable external radial wall of said body separating said zones from one another, this deformable external radial wall extending transverse to the longitudinal axis of said body, wherein the deformable external radial wall, the small base and the large base of the body are made in one piece, in that the deformable external radial wall of said body, which has a face turned toward the small base of the body, is provided at its zone for connection to the large base of the body with an external peripheral groove with an external radial opening, in that this groove comprises at least two flanks and a bottom, in that the flanks of the groove extend one on one side and the other on the other side of a plane that is perpendicular to the longitudinal axis of the body and passes through the bottom of the groove, in that one of the flanks and the bottom of the groove protrude from the face of the deformable external radial wall that is turned toward the small base of the body so as to form a reinforcing rib, and in that the deformable external radial wall is a pleated wall comprising one or more pleats, the one or more pleats extending on the same side of the plane that is perpendicular to the longitudinal axis of the body and passes through the bottom of the groove, this side of the plane corresponding to the side of the plane that is turned toward the large base of the body.

2. The protective boot as claimed in claim 1, wherein the deformable external radial wall comprises, from its zone for connection to the large base of the body that forms the external peripheral edge of said wall in the direction of its opposite peripheral edge, a succession of at least three pleats.

3. The protective boot as claimed in claim 2, wherein the succession of at least three pleats comprises a concave pleat with concavity turned toward the small base, a convex pleat with convexity turned toward the small base and a concave pleat with concavity turned toward the small base.

4. The protective boot as claimed in claim 1, wherein the small base has an active fastening part separated from the deformable external radial wall by a tubular part of the body that is called the transition zone, this transition zone between the deformable external radial wall and the active fastening part of the small base having, at the level of the tubular part of the body that delimits same, a thickness of said body that is greater than the thickness of the deformable external radial wall.

5. The protective boot as claimed in claim 4, wherein this transition zone between the external radial wall and the active fastening part of the small base has a thickness of the body that increases from the external radial wall in the direction of the free end of said small base.

6. The protective boot as claimed in claim 1, wherein the body has a thickness that increases from the external peripheral edge of the deformable external radial wall that is formed by the zone for connecting said wall to the large base of the body in the direction of the free end of the small base of the body.

7. The protective boot as claimed in claim 1, wherein the flank of the groove that protrudes from the face of the deformable external radial wall that is turned toward the small base of the body has a free edge that is set back from a part of the body that serves to delimit the large base of the body.

8. The protective boot as claimed in claim 1, wherein the groove has a C or U shape when viewed in section.

9. A transmission joint for a vehicle transmission, comprising a male element and a female element and a boot for at least partial protection of said male element and female element, wherein said protective boot is in accordance with claim 1.

* * * * *